United States Patent
Naegle et al.

(10) Patent No.: US 7,292,207 B1
(45) Date of Patent: Nov. 6, 2007

(54) COMPUTING BLENDING FUNCTIONS FOR THE TILING OF OVERLAPPED VIDEO PROJECTORS

(75) Inventors: Nathaniel David Naegle, Pleasanton, CA (US); Clayton W. Castle, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 608 days.

(21) Appl. No.: 10/929,115

(22) Filed: Aug. 27, 2004

(51) Int. Cl.
*G09G 5/00* (2006.01)

(52) U.S. Cl. ..................................... 345/1.3; 345/589

(58) Field of Classification Search .................. 345/1.1, 345/1.3, 589, 639, 647; 348/580, 744, 383; 353/94
See application file for complete search history.

(56) References Cited

U.S. PATENT DOCUMENTS

| | | | |
|---|---|---|---|
| 5,444,478 A | 8/1995 | Lelong et al. | |
| 5,594,845 A | 1/1997 | Florent et al. | |
| 5,734,446 A * | 3/1998 | Tokoro et al. | 348/745 |
| 5,956,000 A * | 9/1999 | Kreitman et al. | 345/1.3 |
| 5,966,177 A | 10/1999 | Harding | |
| 5,978,142 A | 11/1999 | Blackham et al. | |
| 6,017,123 A | 1/2000 | Bleha et al. | |
| 6,069,668 A * | 5/2000 | Woodham et al. | 348/578 |
| 6,222,593 B1 | 4/2001 | Higurashi et al. | |
| 6,304,245 B1 | 10/2001 | Groenenboom | |
| 6,367,933 B1 * | 4/2002 | Chen et al. | 353/69 |
| 6,590,621 B1 | 7/2003 | Creek et al. | |
| 6,771,272 B2 | 8/2004 | Deering | |
| 7,002,589 B2 | 2/2006 | Deering | |
| 2002/0008697 A1 | 1/2002 | Deering | |
| 2002/0012004 A1 | 1/2002 | Deering | |

* cited by examiner

*Primary Examiner*—Kevin M. Nguyen
(74) *Attorney, Agent, or Firm*—Meyertons Hood Kivlin Kowert & Goetzel, P.C.; Jeffrey C. Hood; Mark K. Brightwell

(57) ABSTRACT

A system for correcting the intensities of pixels supplied to a projector. An image generated by the projector has a number of regions formed by the overlapping of the image with one or more other images generated by one or more other projectors. The system includes: a first unit configured to generate a horizontal scaling value; a second unit configured to generate a vertical scaling value; a first multiplier configured to multiply the horizontal scaling value and the vertical scaling value to obtain a scaling coefficient, and a set of one or more additional multipliers configured to multiply components of an input pixel by the scaling coefficient to determine components for an output pixel. The first unit and second unit compute their respective scaling values in a way that allows for regions whose boundaries non-aligned in the vertical direction.

20 Claims, 9 Drawing Sheets

COMPUTING BLENDING FUNCTIONS FOR THE TILING OF OVERLAPPED VIDEO PROJECTORS

BACKGROUND OF THE INVENTION

1. Field of the Invention

This invention relates generally to the field of computer graphics and, more particularly, to a graphics system configured to compute blending functions for overlapped video projectors.

2. Description of the Related Art

For large format visualization applications, especially for group presentation, or for immersive virtual reality display, it is often desirable to use several video projectors whose projected images tile a display surface. The surface may be curved or otherwise non-flat.

A major requirement for many of these visualization applications is that there be no seam or visual discontinuity between the regions displayed by the respective projectors. This is quite difficult to achieve, because of unavoidable differences in the brightness, color temperature, and other characteristics of the projectors, and because of the human visual system's sensitivity to visual artifacts having high spatial frequency, such as abrupt boundaries.

To overcome these problems, the projected areas are often overlapped to some extent (e.g., 10 to 25% per linear dimension) and a gradual transition is accomplished between the content displayed by one projector and its neighboring projector(s). Overlapping the projected areas requires further processing of the video content displayed by each projector, so that the overlap areas are not brighter than the non-overlapped areas. (The brightness perceived in an overlap area is an optical sum of the brightness profile of each projector hitting the overlap area.)

Typically, within an overlap area, the video intensity of each projector will be gradually diminished as it approaches the boundary of its region. The contribution of one projector will ramp down as the contribution from its neighboring projector ramps up. Since tiling can be done both horizontally and vertically, overlap areas may occur on the sides, top and bottom of an image projected by a single projector. The processing of video to accomplish this ramping is commonly known as "edge blending."

An installation with three projectors arranged to project onto a flat surface is shown in FIG. 1. An installation with three projectors arranged to project onto a curved display surface is shown in FIG. 2.

Edge blending overlaps usually consume a significant percentage of the screen area so that the transitions occur with a low spatial frequency. Human vision is comparatively insensitive to low spatial-frequency artifacts.

Edge blending may be accomplished by weighting digital video RGB values provided to each of the projectors. The weights may be chosen to achieve (or approximate) the condition of uniform brightness over the whole visual field (i.e., the union of all regions) as suggested in FIGS. 3 and 4.

Nonuniformities in perceived intensity may be induced by means other than region overlap. For example, consider the installation shown in FIG. 5. Across the field of projector C, the screen distance varies considerably. Intensity varies as the inverse-square of distance. Thus, there will be a significant change in the intensity due to projector C across region C.

Therefore, there exists a need for systems and methods capable of compensating for the nonuniformity of perceived brightness in display systems composed of multiple overlapping projector images.

SUMMARY

A system for correcting the intensities of pixels supplied to a projector. An image generated by the projector has a number of regions formed by the overlapping of the image with one or more other images generated by one or more other projectors. The system includes: a first unit configured to generate a horizontal scaling value; a second unit configured to generate a vertical scaling value; a first multiplier configured to multiply the horizontal scaling value and the vertical scaling value to obtain a scaling coefficient, and a set of one or more additional multipliers configured to multiply components of an input pixel by the scaling coefficient to determine components for an output pixel. The first unit and second unit compute their respective scaling values in a way that allows for regions whose boundaries non-aligned in the vertical direction.

The first unit is configured to compute an address U in the address space of a horizontal weight table. The address U as a function of horizontal pixel index I is piecewise linear. The first unit is configured to access stored values from the horizontal weight table using the address U and compute the horizontal scaling value based on the accessed values.

Similarly, the second unit is configured to compute an address V in the address space of a vertical weight table. The address V as a function of vertical pixel index J is piecewise linear. The second unit is configured to access stored values from the vertical weight table using the address V and compute the vertical scaling value based on the accessed values.

Furthermore, the first unit is configured to vary the addresses $U_0$, $U_1$ and $U_2$ that bound the linear sections of the piecewise linear function as a function of the vertical pixel position. For example, the first unit may vary the addresses $U_0$, $U_1$ and $U_2$ by adding corresponding horizontal step values to the addresses $U_0$, $U_1$ and $U_2$ once per horizontal line.

BRIEF DESCRIPTION OF THE DRAWINGS

A better understanding of the present invention can be obtained when the following detailed description is considered in conjunction with the following drawings, in which.

Figure 1:
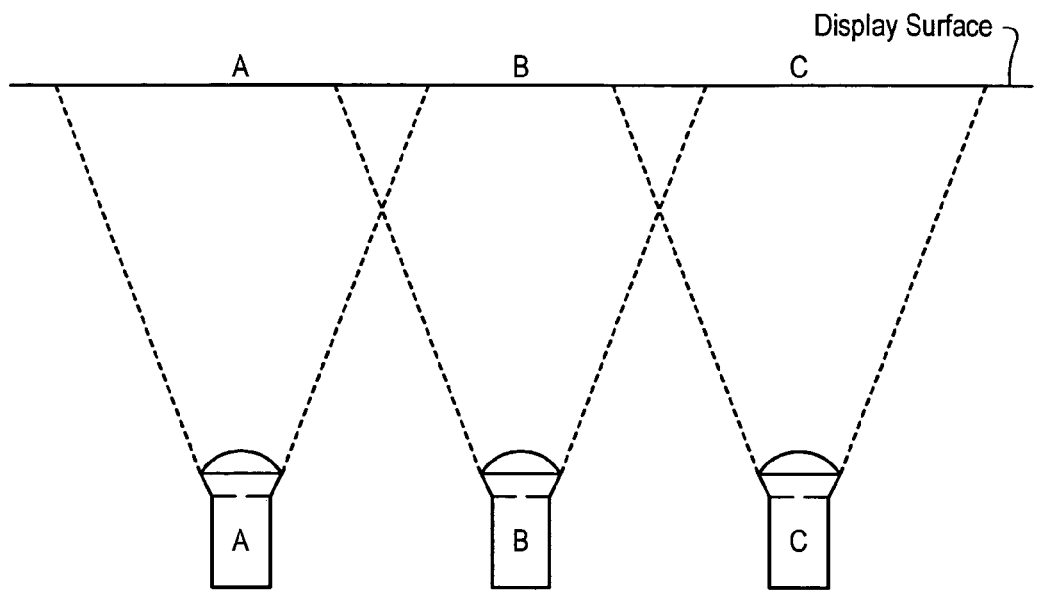
FIG. 1 illustrates a scenario of multiple projectors generating overlapping images on a display surface.
Figure 2:
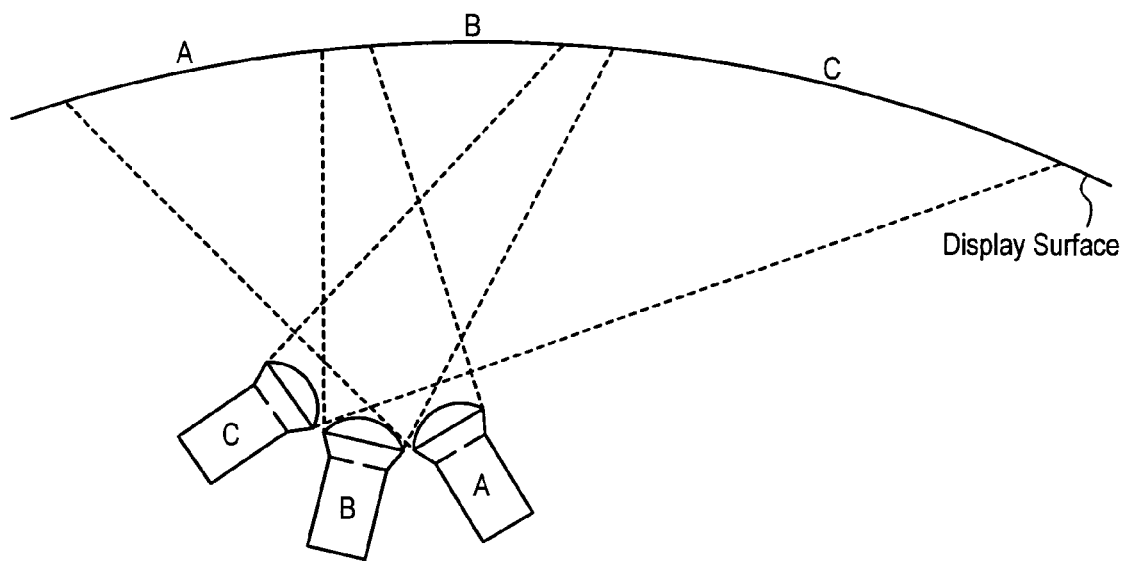
FIG. 2 illustrates a scenario of multiple projectors generating overlapping images on a curves display surface.
Figure 3:
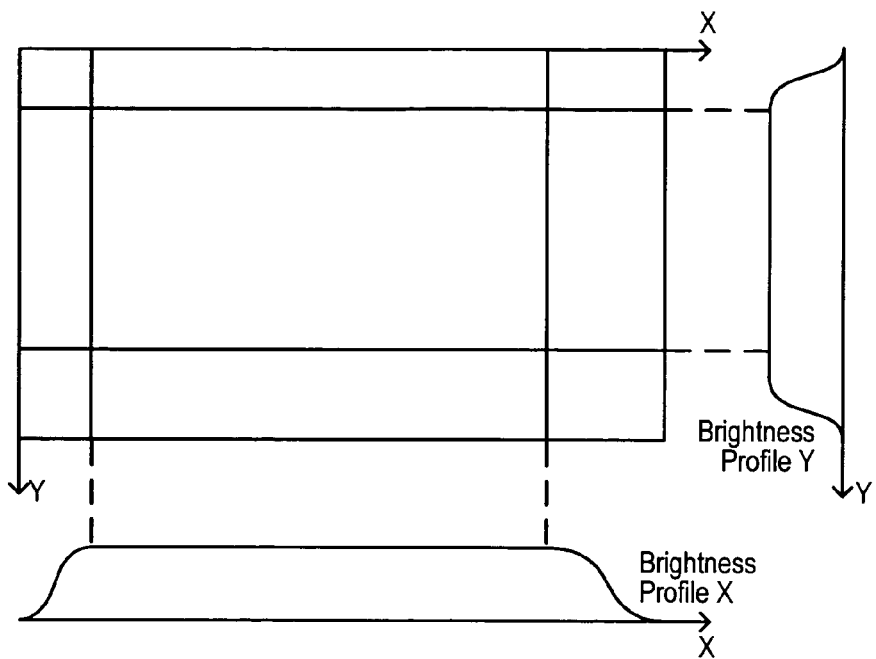
FIG. 3 illustrates how the distribution of pixel intensities may be configured to fall off at the boundaries of a projected image in order to achieve blending with the images generated by other projectors.
Figure 4:
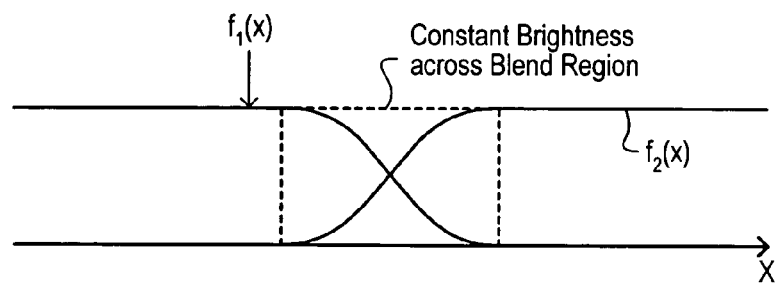
FIG. 4 illustrates how the intensity distributions of two overlapping projectors may be configured to add to one in an overlap region to approximate a condition of uniform brightness.
Figure 5:
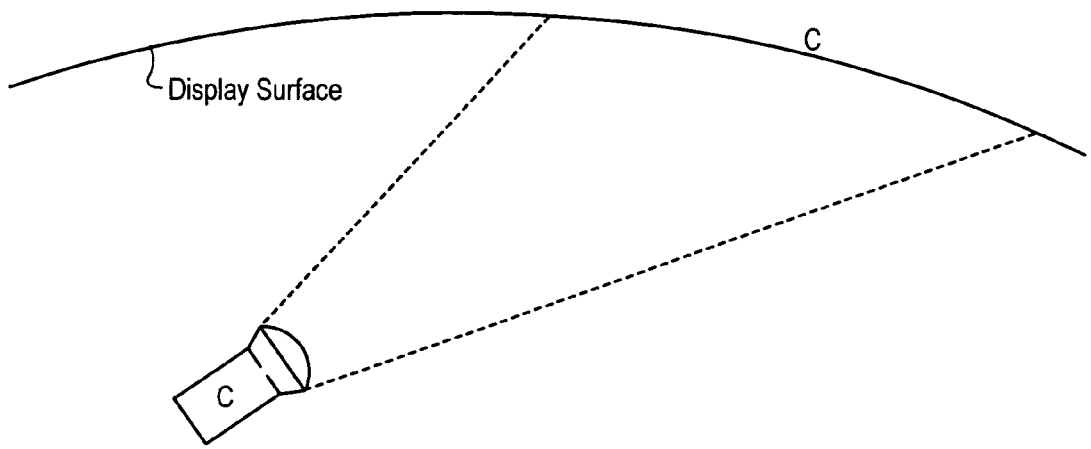
FIG. 5 suggests how the intensity of pixels decreases as the distance from the projector to the points where the pixels hit the display surface increases.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE
PREFERRED EMBODIMENTS

In one set of embodiments, a compensation unit may be configured to receive a video stream and scale the RGB values of pixels in the video stream. The video stream conforms to a video raster having horizontal resolution $R_X$ and vertical resolution $R_Y$. The scaled pixels form an output video stream which is used to drive a projector. The projector generates a time-varying image on a display surface in response to the output stream (or an analog video signal derived from the output stream). Under somewhat idealized conditions, the generated image may resemble image 200 as suggested in FIG. 6.

Regions 1-9 are indicated within image 200. Regions 1-4 and 6-9 are regions of overlap with neighboring images generated by other projectors. (For example, visualize four other projectors that generate four neighboring images: one above, one below, one to the right, and one to the left of image 200.) Region 5 is that portion of image 200 which is not shared with any other projector. Observe that the boundaries of the regions 1-9 are aligned with the video raster, i.e., aligned with horizontal and vertical lines of pixels in the video raster. Thus, the boundaries between the regions may be characterized by horizontal pixel positions $I_1$ and $I_2$ and vertical pixel positions $J_1$ and $J_2$.

The compensation unit applies a weight function f(I,J) to each pixel Q(I,J) of the received video stream, where I is a horizontal pixel index and J is a vertical pixel index of the video raster. The weight function f(I,J) may be separable, i.e., may be modeled as a product of horizontal and vertical functions: $f(I,J)=f_X(I)*f_Y(J)$. Thus, the compensation unit may include (or couple to) a horizontal weight table having $N_X$ entries and a vertical weight table having $N_Y$ entries. The horizontal weight table stores values $W_X(K)$, K=0, 1, 2, ..., $N_X$–1. The vertical weight table stores values $W_Y(L)$, L=0, 1, 2, ..., $N_Y$–1. The values $W_X(K)$ and the values $W_Y(L)$ are programmable by host software. The table sizes $N_X$ and $N_Y$ are integers greater than or equal to four. In one set of embodiments, $N_X=N_Y=2^T$, where T is any integer greater than or equal to two. In one particular embodiment, $N_X=N_Y=64$.

The bit length $L_X$ of the entries in the horizontal weight table and the bit length $L_Y$ of the entries in the vertical weight table may be integers greater than or equal to two. In one set of embodiments, the lengths $L_X$ and $L_Y$ may take values in the range from 8 to 16. In some embodiments, $L_X$ and $L_Y$ may takes values in the set {10, 11, 12, 13)}.

Figure 7A:
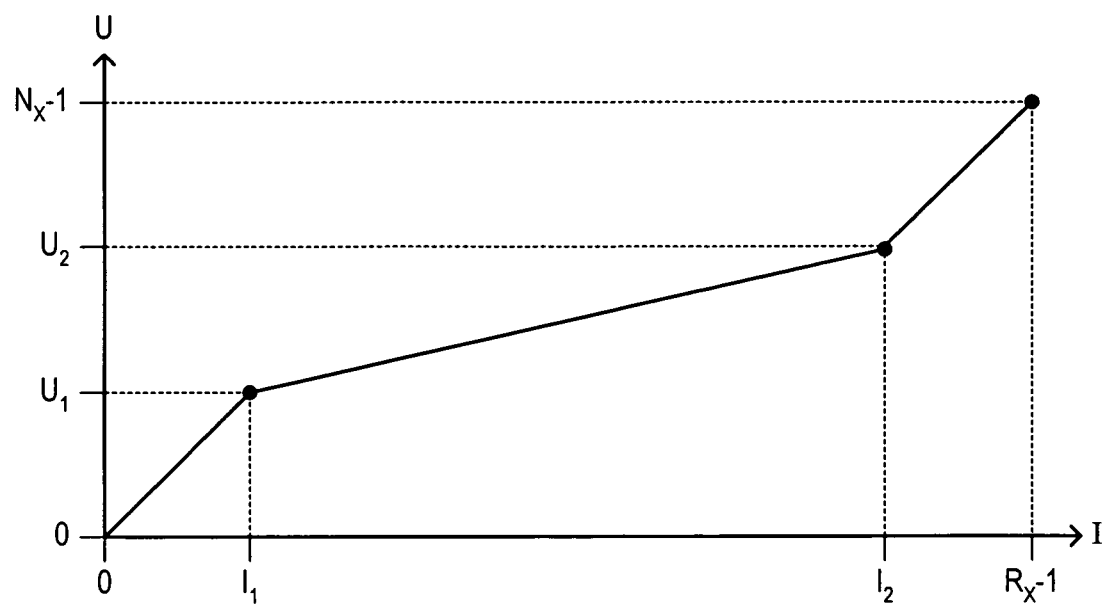
FIG. 7A illustrates the continuous piecewise linear relationship between horizontal table address U and horizontal pixel index I.

As the complexity of the horizontal compensation function $f_X(I)$ may be different in the intervals $[0,I_1]$, $[I_1,I_2]$ and $[I_2,R_X-1]$ of the horizontal pixel index I, a user may not necessarily desire to allocate equal amounts of space in the horizontal weight table to each interval. For example, the horizontal compensation function $f_X(I)$ may be a raised cosine function on the first interval $[0,I_1]$ and a constant (or some slowing moving function) on the second interval $[I_1,I_2]$. In this case, a system operator (or an automated configuration agent) may allocate a larger number of entries in the horizontal weight table to represent the function $f_X(I)$ on the first interval $[0,I_1]$ than on the second interval $[I_1,I_2]$. In general, varying amounts of space in the horizontal weight table may be allocated to the respective intervals as follows: table entries in the address range [0,U1] may be used to represent the horizontal compensation function $f_X(I)$ on the interval $[0,I_1]$; table entries in the address range [U1,U2] may be used to represent the horizontal compensation function $f_X(I)$ on the interval $[I_1,I_2]$; and table entries in the address range $[U2,N_X-1]$ may be used to represent the horizontal compensation function $f_X(I)$ on the interval $[I_2, R_X-1]$, where $0 \leq U1$, $U1 \leq U2$, and $U2 \leq N_X-1$. Thus, if position in the address space of the horizontal weight table is represented by a continuous variable U, the general mapping between horizontal pixel index I and table position U may be characterized as being continuous and piecewise linear as suggested by FIG. 7A.

Figure 7B:
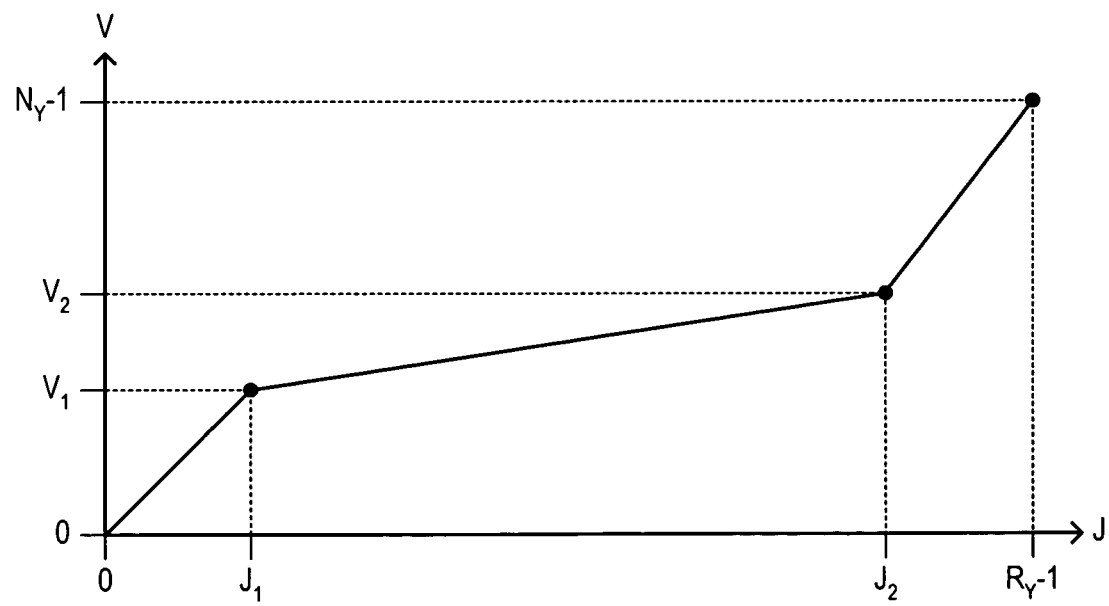
FIG. 7B illustrates the continuous piecewise linear relationship between vertical table address V and vertical pixel index J.

In a similar fashion, the complexity of the vertical compensation function $f_Y(J)$ may be different in the intervals $[0,J_1]$, $[J_1,J_2]$ and $[J_2,R_Y-1]$ of the vertical pixel index J. Thus, varying amounts of space in the vertical weight table may be allocated to the respective intervals as follows: table entries in the address range [0,V1] may be used to represent the vertical compensation function $f_Y(J)$ on the interval $[0,J_1]$; table entries in the address range [V1,V2] may be used to represent the vertical compensation function $f_Y(J)$ on the interval $[J_1,J_2]$; and table entries in the address range $[V2,N_Y-1]$ may be used to represent the vertical compensation function $f_Y(J)$ on the interval $[J_2,R_Y-1]$, where $0 \leq V1$, $V1 \leq V2$, and $V2 \leq N_Y-1$. If position in the address space of the vertical weight table is represented by a continuous variable V, the general mapping between vertical pixel index J and table position V may be characterized as being continuous and piecewise linear as suggested by FIG. 7B.

For each pixel Q(I,J) of the received video stream, the compensation unit reads table values from the horizontal and vertical weight tables, computes the weight function value f(I,J) from the table values, and scales the color components (R,G,B) of the pixel Q(I,J) according to the relations: R'=R*f(I,J), G'=G*f(I,J), B'=B*f(I,J). The scaled pixel (R', G',B') may be incorporated into the output video stream. The output video stream is used to drive the projector which generates image 200.

The compensation unit receives a pixel clock signal and an Hsync signal (i.e., a horizontal synchronization signal) that corresponds to the input video stream. The compensation unit updates the horizontal position variable U in response to transitions of the pixel clock and updates the vertical position variable V in response to transitions of the Hsync signal. The horizontal position variable U runs through the interval $[0, N_X-1]$ in $R_X$ steps as the video raster moves across each video line. The vertical position variable V runs through the range $[0, N_Y-1]$ in $R_Y$ steps that correspond to the successive lines in each video frame.

The integer [U], i.e., the integer part of U, is used to access the horizontal weight table for values $W_X([U])$ and $W_X([U]+1)$. The compensation unit uses the fractional part of U to interpolate between $W_X([U])$ and $W_X([U]+1)$ according to the relations $$\alpha = U - [U]$$

$$f_X(I) = (1-\alpha) * W_X([U]) + \alpha * W_X([U]+1).$$

Similarly, the integer [V], i.e., the integer part of V, is used to access the vertical weight table for values $W_Y([V])$ and $W_Y([V]+1)$. The compensation unit uses the fractional part of V to interpolate between $W_Y([V])$ and $W_Y([V]+1)$ according to the relations $$\beta = V - [V]$$

$$f_Y(J) = (1-\beta) * W_Y([V]) + \beta * W_Y([V]+1).$$

The weight function value f(I,J) is determined by multiplying $f_X(I)$ and $f_Y(J)$, i.e., $f(I,J) = f_X(I) * f_Y(J)$.

The compensation unit may include a first adder-accumulator for incrementing the horizontal position variable U and a second adder-accumulator for incrementing the vertical position variable V. The step size $S_X$ used by the first adder-accumulator may vary from one region to the next. Similarly, the step size $S_Y$ used by the second adder-accumulator may vary from one region to the next.

Figure 8:
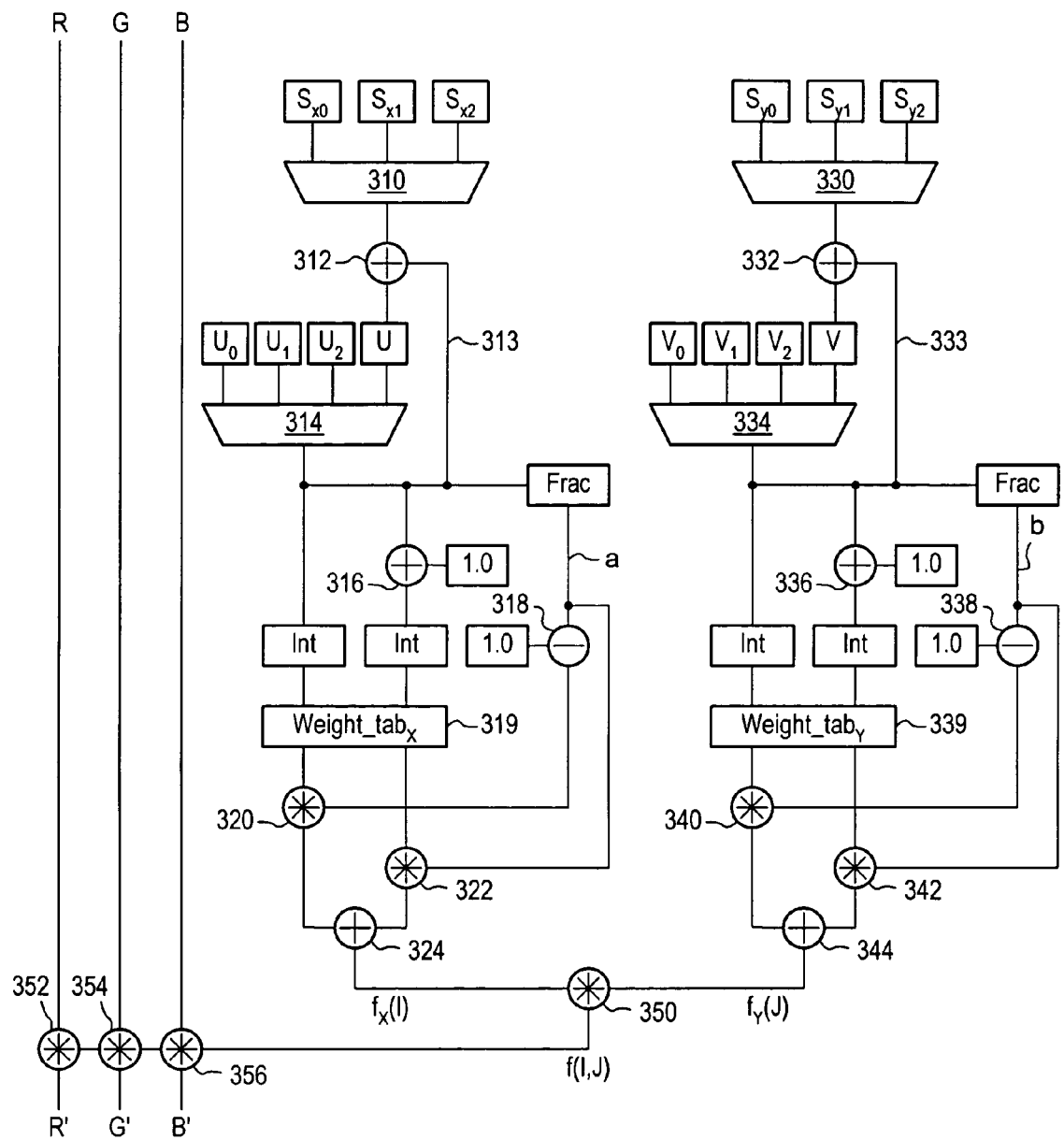
FIG. 8 illustrates one embodiment of a circuit for modulating the pixel intensities provided to a projector.

In one set of embodiments, the compensation unit may include the circuitry 300 illustrated in FIG. 8. Circuitry 300 may include multiplexors 310, 314, 330 and 334, adders 312, 316, 324, 332, 336 and 344, subtraction circuits 318 and 338, multipliers 320, 322, 340, 342, 350, 352, 354 and 356, a horizontal weight table 319 (as described above) and a vertical weight table 339 (as described above).

Control logic (to be described more fully later) determines when the video is entering a region. When the video enters a region by virtue of crossing one of the vertical boundaries (e.g., $I=I_1$), the control logic induces multiplexor 314 to select a corresponding one of the initial positions $U_0$, $U_1$ and $U_2$ and multiplexor 310 to select a corresponding one of the step-sizes $Sx_0$, $Sx_1$ and $Sx_2$. Inside the region, the control logic induces multiplexor 314 to select the input from the register U. Thus, a first adder-accumulator, including adder 312, the register labeled U and the feedback path 313, serves to repeatedly increment the horizontal position variable U in response to transitions of the pixel clock. The initial positions $U_0$, $U_1$ and $U_2$ and step-sizes $Sx_0$, $Sx_1$ and $Sx_2$ are programmable.

Similarly, when the video enters a region by virtue of hitting the last pixel in one of the horizontal boundaries (e.g., $J=J_1$), the control logic induces multiplexor 334 to select a corresponding one of the initial positions $V_0$, $V_1$ and $V_2$ and multiplexor 330 to select a corresponding one of the step-sizes $Sy_0$, $Sy_1$ and $Sy_2$. Inside the region, the control logic induces multiplexor 334 to select the input from register V. Thus, a second adder-accumulator including adder 332, the register V and the feedback path 333 serves to repeatedly increment the vertical position variable V in response to transitions of the Hsync signal. The initial positions $V_0$, $V_1$ and $V_2$ and step-sizes $Sy_0$, $Sy_1$ and $Sy_2$ are programmable.

In each pixel clock cycle, the integer parts of U and U+1 may be used as addresses to access the horizontal weight table 319 for the values $W_X([U])$ and $W_X([U+1])$ respectively. The integer part of U is realized by a high-order subset of the output lines supplied by multiplexor 314. The integer part of U+1 is realized by a high-order subset of the output lines supplied by adder 316. The value $W_X([U])$ is multiplied by the value $(1-\alpha)$ supplied by the subtraction circuit 318 to determine a first product. The value $W_X([U+1])$ is multiplied by the value a to determine a second product. These multiplications may be performed in parallel by multipliers 320 and 322 respectively. The value $\alpha$ is realized by a lower-order subset (e.g., the fractional part) of the output lines supplied by multiplexor 314. Adder 324 adds the first product and second product to determine the horizontal weight value $f_X(I)$.

In parallel with the operations described above, in each pixel clock cycle, the integer parts of V and V+1 may be used as addresses to access the vertical weight table 339 for the values $W_Y([V])$ and $W_Y([V+1])$ respectively. The integer part of V is realized by a high-order subset of the output lines supplied by multiplexor 334. The integer part of V+1 is realized by a high-order subset of the output lines supplied by adder 336. The value $W_Y([V])$ is multiplied by the value $(1-\beta)$ supplied by the subtraction circuit 338 to determine a third product. The value $W_Y([V+1])$ is multiplied by the value $\beta$ to determine a fourth product. These multiplications may be performed in parallel by multipliers 340 and 342 respectively. The value $\beta$ is realized by a lower-order subset (e.g., a fractional part) of the output lines supplied by multiplexor 334. Adder 344 adds the third product and fourth product to determine the vertical weight value $f_Y(J)$.

Multiplier 350 multiplies the values $f_X(I)$ and $f_Y(J)$ to determine the pixel weight value f(I,J). Multipliers 352, 354 and 356 multiply the respective color components R, G and B of the pixel Q(I,J) by the pixel weight value f(I,J) in parallel to determine scaled color values R', G' and B'.

FIG. 8 illustrates the scaling of red, green and blue color components of the input pixel Q(I,J). In some embodiments, the pixel Q(I,J) may also include an alpha component A. Thus, circuitry 300 may include an extra multiplier which operates in parallel with multipliers 352, 354 and 356. The extra multiplier may scale the alpha component A according to the relation: A'=A*f(I,J). The scaled pixel (R',G',B',A') may be forwarded to a gamma correction unit.

As described above, the domain of the compensation function f is the entire video raster, and thus, compensation is applied to the whole video raster. However, in some embodiments, the compensation function may have as its domain some subset (or a union of subsets) of the video raster. For example, to concentrate exclusively on correction of a central hot spot in the image 200, the domain of the compensation function may be restricted to central region 5. Thus, the $N_X$ entries of the horizontal weight table may map onto the interval $[I_1, I_2]$ in the horizontal pixel index I, and the $N_Y$ entries of the vertical weight table may map onto the interval $[J_1, J_2]$ in the vertical pixel index J.

Figure 6:
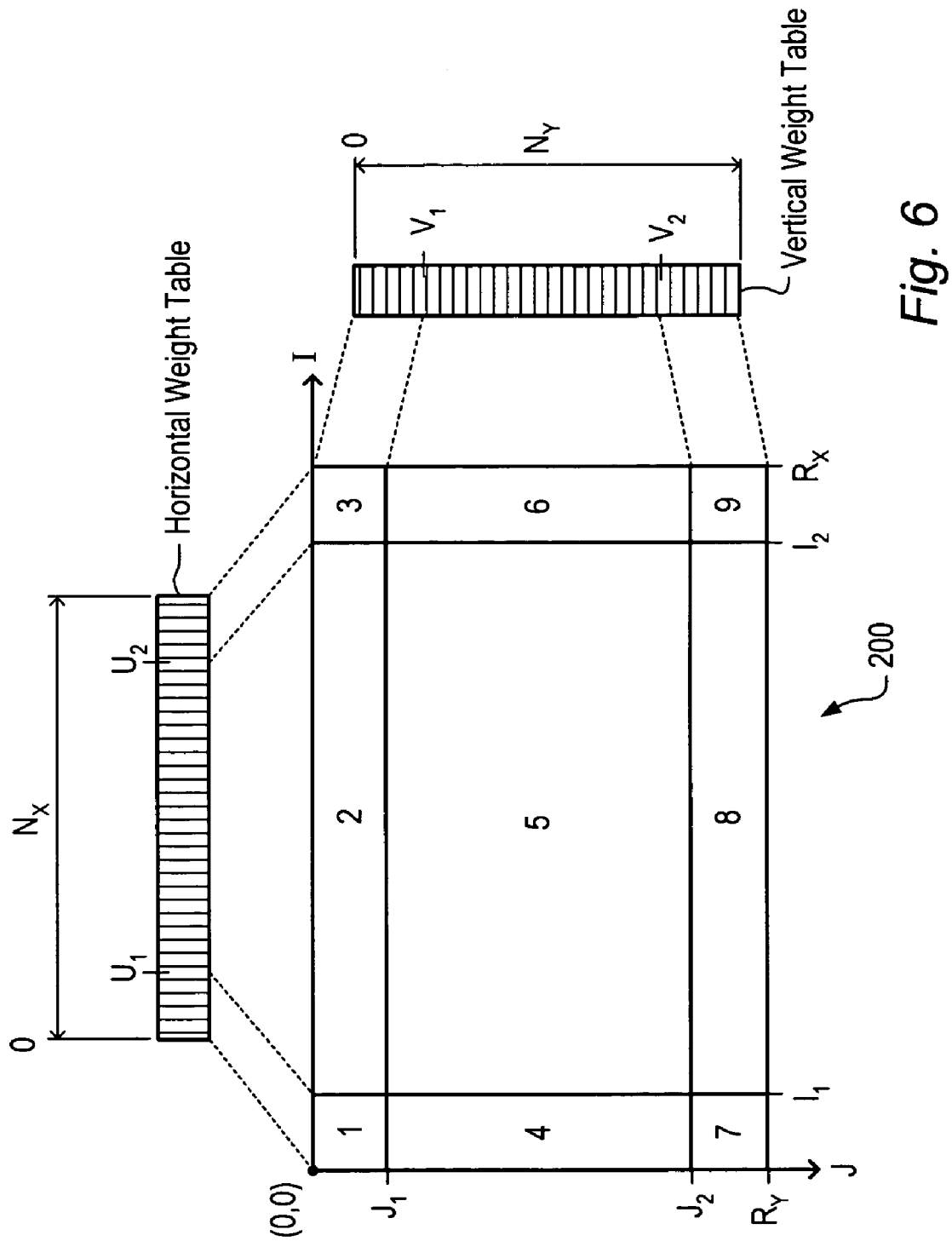
FIG. 6 illustrates a situation where multiple projectors generate images that overlap with horizontally and vertically aligned boundaries.

Note that the embodiment illustrated in FIG. 8 includes treatment for the central region (labeled "5" in FIG. 6). If brightness compensation is not needed in region 5, only two entries need to be allocated for region 5 in each weight table. The weight values of these two entries can be set to 1.0, and the steps through region 5 (i.e., $S_{X1}$ and $S_{Y1}$ in FIG. 8) may be set to 0.0. This programming methodology may be used to configure the compensation unit for unity gain in any of the 9 regions.

Figure 9:
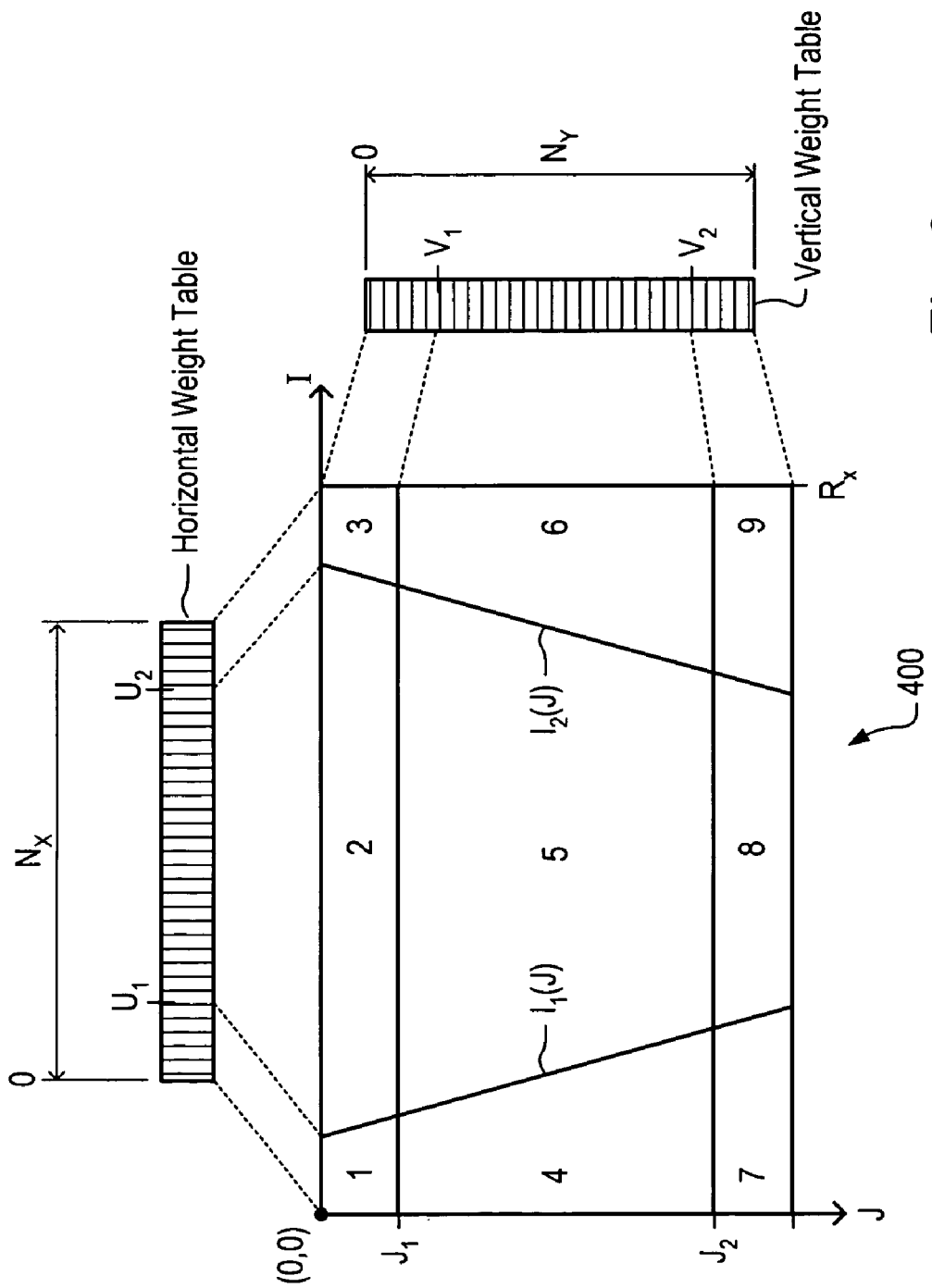
FIG. 9 illustrates a situation where multiple projectors generated images that overlap with non-aligned vertical boundaries.

The situation illustrated in FIG. 6 is somewhat idealized since the overlap regions are assumed to have perfectly horizontal and vertical boundaries. FIG. 9 illustrates a more realistic situation. The image 400 generated by a first projector has regions of overlap with images generated by other projectors. Imagine four other projectors which are aimed above, below, right and left of image 400. The overlap regions have horizontally aligned boundaries and vertically non-aligned boundaries. The vertical boundary lines at $I=I_1$ and $I=I_2$ from FIG. 6 are now generalized to boundary functions $I=I_1(J)$ and $I=I_2(J)$, where I is the horizontal pixel index and J is the vertical pixel index of the video raster. The compensation unit may be configured to deal with this more generalized context.

As described above, the control logic asserts selection signals when the video enters each region. Because the boundaries between regions are described by the equations $I=I_1(J)$, $I=I_2(J)$, $J=J_1$ and $J=J_2$, the control logic is configured to detect if and when these conditions become true as the two-dimensional raster index (I,J) scans through the video raster. The boundary functions $I=I_1(J)$ and $I=I_2(J)$ may be continuous functions, e.g., affine functions.

Note that the horizontal step size (i.e., the step in horizontal table position U with respect to increment in horizontal index I) within a region changes as a function of the vertical pixel index J. The adjustment of the horizontal step sizes may be accomplished by repeatedly adding and accumulating a corresponding secondary delta to the horizontal step size. See the description of FIG. 11 below.

Figure 10:
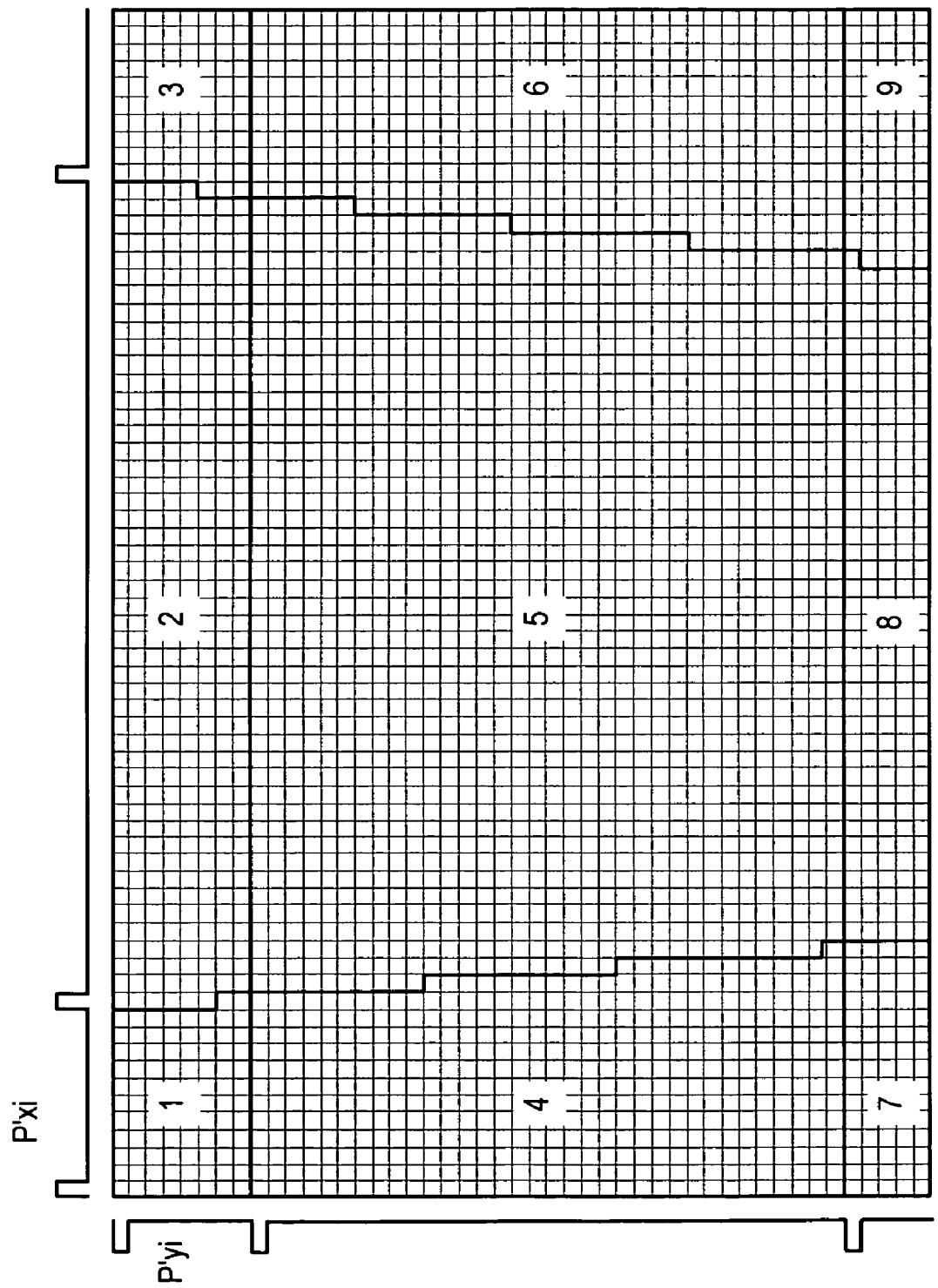
FIG. 10 illustrates a video raster containing nine blend regions which are non-aligned vertically.

While the boundary functions $I=I_1(J)$ and $I=I_2(J)$ are continuous, the corresponding boundaries between regions are jagged edges as suggested in FIG. 10. (See, e.g., the boundary between the union of regions 1, 4 and 7 and the union of regions 2, 5 and 8.)

However, the weight values stored into the horizontal and vertical weight tables may be chosen to approximate weighting functions that are continuous and differentiable at the boundaries. Thus, abrupt changes in intensity at the boundaries may be avoided. Therefore, observers should not perceive any jaggedness along the boundaries.

Figure 11:
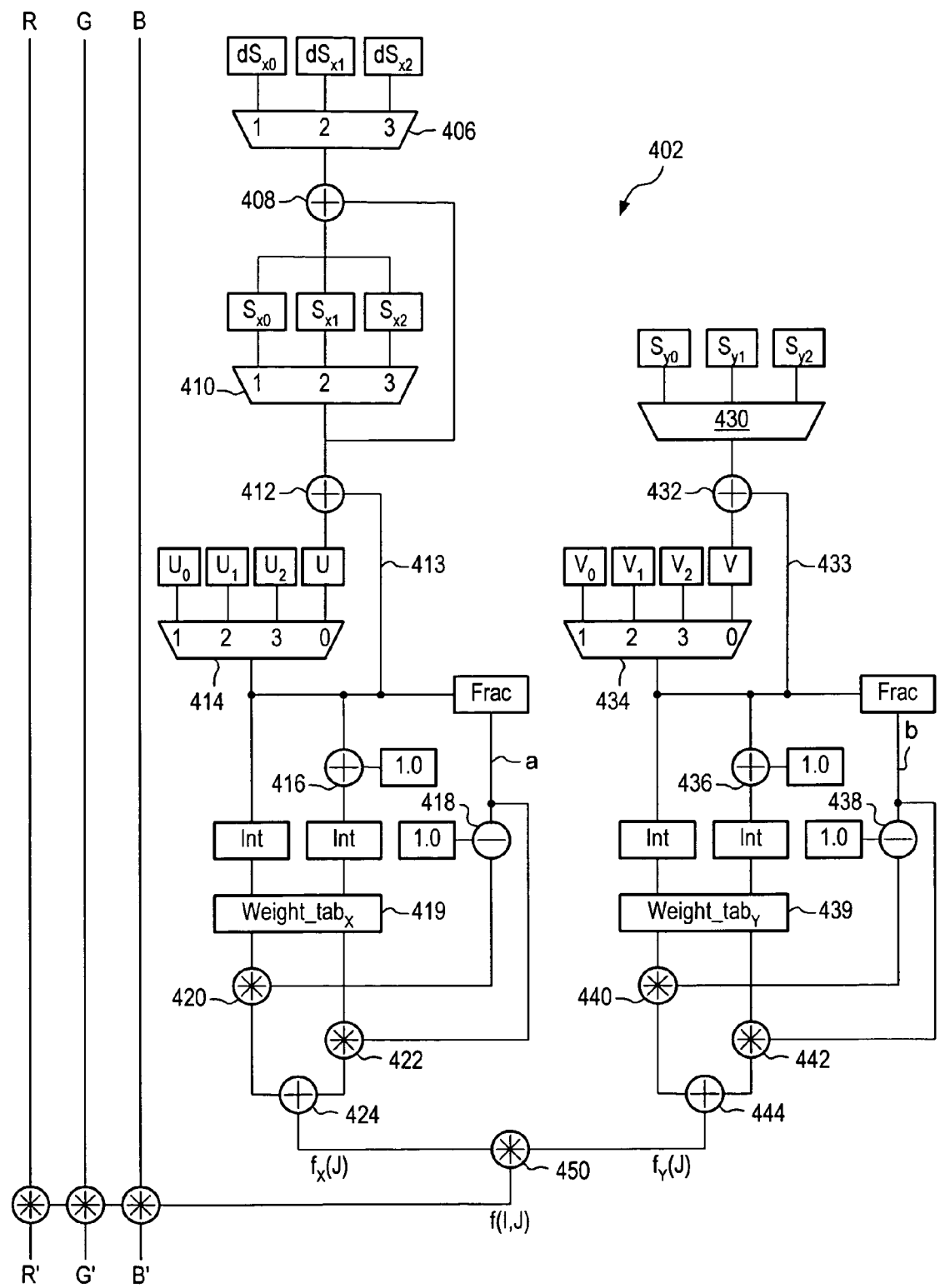
FIG. 11 illustrates one embodiment of a circuit 402 configured for modulating the pixel intensities provided to a projector and especially configured to provide brightness compensation for the situation suggested in FIGS. 9 and 10.

FIG. 11 depicts circuitry 402 configured to handle the non-aligned boundary scenario suggested by FIG. 9. Once per frame, registers $Sx_0$, $Sx_1$, $Sx_2$ are re-initialized to their starting values. Otherwise, the boundaries would continue to change from frame to frame, instead of remaining static on the screen.

Rules for selecting U and $U_0$, $U_1$, $U_2$

The video frame starts with the multiplexer selecting the register $U_0$. The register $U_0$ is also selected at the beginning of each horizontal line. In any horizontal line, the register U2 may be selected when the horizontal pixel index I traverses the boundary function $I_1(J)$. In any horizontal line, the register $U_2$ may be selected when the horizontal pixel index I traverses the boundary function $I_2(J)$. In any horizontal line, for each pixel clock after having selected register $U_K$ and prior to selecting $U_{K+1}$, the U register is selected, thereby allowing a Bresenham-style DDA (digital differential accumulator) to produce the address for the horizontal weight table.

The timing of the Uk select signal for the first horizontal line is shown in FIG. 10. The timing will change on subsequent lines. For example, register $U_1$ is selected at pixel 12 for the first 6 lines, and then at pixel 13 on the 7th line.

The registers $U_0$, $U_1$ and $U_2$ may be loaded once when video is initialized.

Rules for selecting $Sx_0$, $Sx_1$, $Sx_2$

Prior to the start of the current video frame, the multiplexer 410 selects $Sx_2$ (that's where it was left at the end of the last video frame). When the horizontal pixel index I equals zero, the multiplexer 410 selects $Sx_0$. When the horizontal pixel index I traverses the boundary function $I_1(J)$, the multiplexer 410 selects $Sx_1$. When the horizontal pixel index I traverses the boundary function $I_2(J)$, the multiplexer selects $Sx_2$. This selection scheme ensures that the multiplexer 410 has been stable for exactly 1 clock period before the output of the multiplexer 410 is used to compute U. Note that the registers $Sx_0$, $Sx_1$ and $Sx_2$ have been re-initialized to their original values during vertical retrace time.

The register $Sx_k$, k=0, 1, 2, may be loaded with the output of adder 408 on the pixel clock after the register $Sx_{k+1}$ is selected by multiplexer 410, thereby loading the value $Sx_K+dSx_K$ into the $Sx_K$ register. (If k=2, $Sx_{K+1}$ is taken to be $Sx_0$.) This gives the multiplexer 410 the maximum possible settling time before its output will be used to compute U.

Rules for selecting $dSx_0$, $dSx_1$, $dSx_2$.

The video frame starts out selecting $dSx_0$. On the pixel clock after loading register $Sx_K$ from the output of adder 400, the multiplexer 406 selects register $dSx_{K+1}$. (If k=2, $dSx_{K+1}$ is taken to be $dSx_0$.) This selection scheme ensures that multiplexer 406 has been stable for awhile (more than a clock period) before the output of multiplexer 406 is used to modify any of the registers $Sx_0$, $Sx_1$ or $Sx_2$.

Counting Through the Regions

Figure 12:
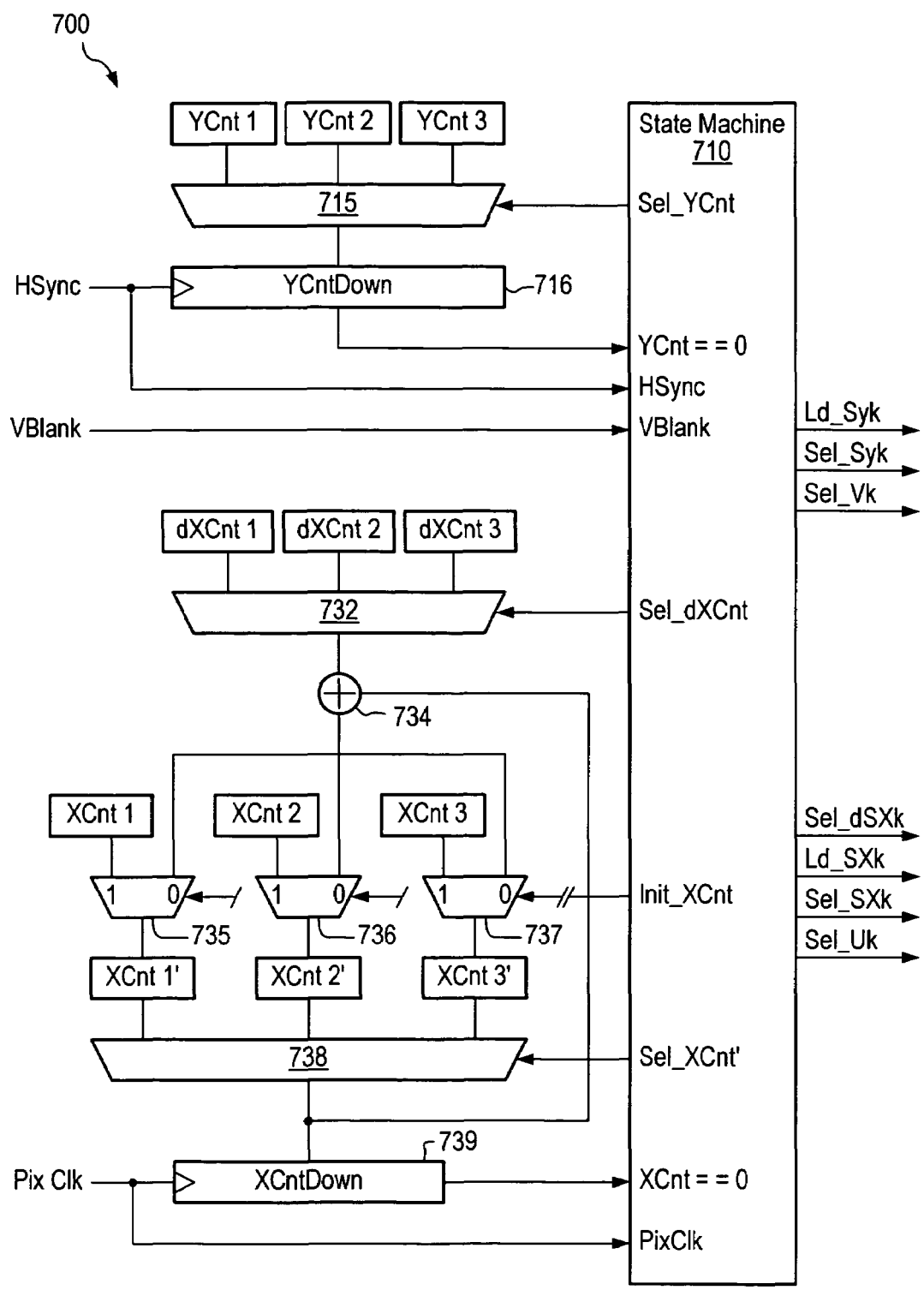
FIG. 12 illustrates one embodiment of controller configured to provide control signals to the circuit of FIG. 11.

FIG. 12 illustrates one set of embodiments of a controller 700 for controlling circuitry 402. The controller 700 includes:

- a state machine 710;
- registers YCnt1, YCnt2, YCnt3 for storing the region heights $J_1$, $(J_2-J_1)$ and $(R_Y-1-J_2)$ respectively;
- multiplexer 715 for selecting one of YCnt1, YCnt2 or YCnt3; decrement unit 716 for receiving the selected YCntk value from multiplexer 715 and for decrementing down to zero;
- registers XCnt1, XCnt2, XCnt3 for storing the initial region widths $I_1(0)$, $(I_2(0)-I_1(0))$ and $(R_X-1-I_2(0))$;
- registers XCnt1', XCnt2' and XCnt3' for storing the current region widths;
- registers dXCnt1, dXCnt2 and dXCnt3 for storing increments in the region widths; multiplexers 735, 736 and 737 for selecting the initial region width from the corresponding register XCntk or the incremented region width from the output of adder 734;
- multiplexer 738 for selecting one of the current region widths XCnt1', XCnt2' or XCnt3';
- adder 734 for incrementing the region widths; and
- decrement unit 739 for receiving the selected current region width XCntk' from multiplexer 738 and for decrementing down to zero.

Decrement unit 739 receives the selected current region width XCntk' from multiplexer 738 and stores the selected current region width XCntk' in an internal register denoted XCnt. Decrement unit 739 decrements the value of the XCnt register by one in response to each rising-edge (or alternatively, falling edge) in the pixel clock signal. The state machine 710 may be configured to detect when the value of the XCnt register reaches zero as this event indicates that the horizontal pixel index I has traversed a region boundary. When the value of the XCnt register reaches zero, the state machine 710 may assert the Sel_Uk signal so that the multiplexer 414 (of FIG. 11) selects the initial position $U_{K+1}$ corresponding to the region that has just been entered. When the value of the XCnt register is not equal to zero, the state machine 710 may assert the Sel_Uk signal so that multiplexer 414 selects the U input. Furthermore, in the pixel clock after the clock in which XCnt reaches zero, the state machine 710 may assert Sel_XCnt' so that multiplexer 738 selects $XCnt_{K+1}'$. Thus, the current region width of the region just entered is forwarded to the decrement unit 739.

The pixel widths may vary from one line to the next. For example, in FIG. 10 the horizontal pixel count for region 1 is 11 pixels initially. However, at the $7^{th}$ video line, the horizontal pixel count for region 1 is 12 pixels. The controller 700 may account for this variation by loading register XCntk' with the output of adder 734 in the pixel clock after XCntk' is selected by multiplexer 738. State machine 710 drives the signal Sel_XCnt' that controls multiplexer 738 and the signal Init_XCnt that controls multiplexers 735, 736 and 737. Each of multiplexers 735, 736 and 737 is configured to select between the output of adder 734 and the corresponding initial region width XCntk. Once per frame, the registers XCntk' are reset to their initial values stored in the corresponding registers XCntk.

The state machine 710 also drives the Sel_dXCnt signal which controls the multiplexer 732 so that adder 734 can perform the increment computation given by the expression XCntk'→XCntk'+dXCntk at times governed by the Init_XCnt signal.

The state machine 710 may be further configured to assert the control signals Ld_Syk, Sel_Syk and Sel_Vk and the control signals Sel_dSxk, Ld_Sxk, Sel_Sxk and Sel_Uk, k=0, 1, 2. The signal Ld_Syk determines which of the registers SYK gets loaded. The signal Sel_Syk determines which register SYK gets selected by multiplexer 430. The signal Sel_Vk determines which input gets selected by multiplexer 434. The signal Sel_dSxk determines which input gets selected by multiplexer 406. The signal Ld_Sxk determines which of the registers $Sx_K$ gets loaded. The signal Sel_Sxk determines which input of multiplexer 410 gets selected. The signal Sel_Uk determines which input of multiplexer 414 gets selected. The timing of these control signals has been discussed above in connection with FIG. 11.

Decrement unit 716 receives the selected region height $YCnt_K$ from multiplexer 715 and stores this value in an internal register YCnt. Decrement unit 716 decrements the register value YCnt by one in response to each transition of a horizontal synchronization signal. The horizontal synchronization signal is also supplied to the state machine 710. When the register value YCnt reaches zero, the state machine 710 may assert the Sel_Vk signal to a value that induces multiplexer 434 to select the initial address $V_{K+1}$ corresponding to the region just entered. When the register value YCnt is not equal to zero, the state machine 710 may assert the Sel_Vk signal so that multiplexer 424 selects the V input.

In the pixel clock after YCnt reaches zero, state machine 710 may drive signal Sel_YCnt' so that multiplexer 715 selects the value $YCnt_{K+1}$ corresponding to the region just entered.

State machine may also receive a vertical blanking signal so that it knows when to reset the registers XCntk', k=1, 2, 3, to their initial values.

The controller 700 may use a DDA (digital differential accumulator) structure to modify the pixel widths of the regions. All additions are signed, and the delta values are allowed to take on positive or negative values, so that the counts may increase or decrease over time.

Numerous variations and modifications will become apparent to those skilled in the art once the above disclosure is fully appreciated. It is intended that the following claims be interpreted to embrace all such variations and modifications.

What is claimed is:

1. A system comprising:
    a first unit configured to generate a horizontal scaling value;
    a second unit configured to generate a vertical scaling value;
    a first multiplier configured to multiply the horizontal scaling value and the vertical scaling value to obtain a scaling coefficient;
    a set of one or more additional multipliers configured to multiply components of an input pixel by the scaling coefficient to determine components for an output pixel;
    wherein the first unit is configured to compute an address U in the address space of a horizontal weight table, wherein the address U as a function of horizontal pixel index I is piecewise linear, wherein the first unit is configured to access stored values from the horizontal weight table using the address U and compute the horizontal scaling value based on the accessed values;
    wherein the second unit is configured to compute an address V in the address space of a vertical weight table, wherein the address V as a function of vertical pixel index J is piecewise linear, wherein the second unit is configured to access stored values from the vertical weight table using the address V and compute the vertical scaling value based on the accessed values;
    wherein the first unit is configured to vary the addresses $U_0$, $U_1$ and $U_2$ that bound the linear sections of the piecewise linear function as a function of the vertical pixel position.

2. The system of claim 1, wherein the first unit is configured to vary the addresses $U_0$, $U_1$ and $U_2$ by adding corresponding horizontal step values to the addresses $U_0$, $U_1$ and $U_2$ once per horizontal line.

3. The system of claim 2, wherein the horizontal step values are signed fixed-point quantities.

4. The system of claim 2,
    wherein the first unit includes a first set of registers configured to store the values $U_0$, $U_1$ and $U_2$, a current address register, and a first multiplexer, wherein the first multiplexer is configured to select one of the values $U_0$, $U_1$, $U_2$ or the value of the current address register, wherein the output of the first multiplexer is the address U;
    a first interpolation unit coupled to the output of the first multiplexer and configured to access values from the horizontal weight table and compute the horizontal scaling value based on the accessed values.

5. The system of claim 4, wherein the first interpolation unit is configured to access values located at [U] and [U+1] in the address space of the horizontal weight table and to interpolate between these values based on an alpha value equal to U−[U], where [U] is the integer part of U.

6. The system of claim 4, wherein the first unit further includes a second set of registers, a second multiplexer and a first adder, wherein the second set of registers are configured to store horizontal step values $Sx_0$, $Sx_1$ and $Sx_2$, wherein the second multiplexer is configured to select one of the horizontal step values, wherein the first adder is coupled to receive the selected horizontal step value from the second multiplexer and the address U provided at the output of the first multiplexer, wherein the first adder is configured to add the selected horizontal step value to the address U to obtain an incremented value of the address U, wherein the current address register is coupled to receive the incremented value from the first adder.

7. The system of claim 6, wherein the first unit further includes a third set of registers, a third multiplexer and a second adder, wherein the third set of registers are configured to store increments $dSx_0$, $dSx_1$ and $dSx_2$ for the horizontal step values $Sx_0$, $Sx_1$ and $Sx_2$ respectively, wherein the third multiplexer is configured to select one of the increments $dSx_0$, $dSx_1$ and $dSx_2$, wherein the second adder is configured to receive the selected increment from the third multiplexer and the selected horizontal step value from the second multiplexer, wherein the adder is configured to add the selected increment and the selected horizontal step to obtain an incremented horizontal step, wherein each of the registers of the second set is coupled to receive the output of the second adder, wherein the first unit further includes a controller to direct loading of the incremented horizontal step into one of the registers of the second set.

8. The system of claim 7, wherein the controller is configured to control the selections of the first, second and third multiplexers, wherein the controller includes:
registers for storing current region widths XCnt1', XCnt2' and XCnt3',
a fourth multiplexer for selecting one of the current region widths, and
a first decrement unit for initializing a value XCnt with the selected one and decrementing the value XCnt down towards zero in response transitions of a pixel clock,
wherein the controller is configured to direct the first multiplexer to select the address $U_{K+1}$, when the value XCnt, which has been previously initialized with $XCnt_K'$, K=0, 1 or 2, reaches zero.

9. The system of claim 8, wherein the controller is configured to direct the first multiplexer to select the input from the current address register when the value XCnt is not equal to zero.

10. The system of claim 8, wherein the controller is configured to add corresponding increments to the values XCnt1', XCnt2' and XCnt3' once per line of video, wherein the increments are programmable by a host computer, wherein the increments are signed fixed-point quantities.

11. The system of claim 10, wherein the controller further includes:
registers configured to store width increments dXCnt1, dXCnt2 and dXCnt3,
a fifth multiplexer configured to select one of the width increments, and
an adder configured to receive the selected width increment from the fifth multiplexer and the selected current region width from the fourth multiplexer, wherein the adder is configured to add the selected width increment and the selected current region width to obtain an incremented region width, wherein the controller is configured to load the incremented region width into a corresponding one of the registers XCnt1', XCnt2' and XCnt3'.

12. The system of claim 11, wherein the controller is configured to initialize the registers XCnt1', XCnt2', XCnt3' with their corresponding initial values once per frame.

13. The system of claim 2,
wherein the second unit includes a fourth set of registers configured to store the values $V_0$, $V_1$ and $V_2$, a current address register, and a fourth multiplexer, wherein the fourth multiplexer is configured to select one of the values $V_0$, $V_1$, $V_2$ or the value of the current address register, wherein the output of the fourth multiplexer is the address V;
a second interpolation unit coupled to the output of the fourth multiplexer and configured to access values from the vertical weight table and compute the vertical scaling value based on the accessed values.

14. The system of claim 13, wherein the second interpolation unit is configured to access values located at [V] and [V+1] in the address space of the vertical weight table and to interpolate between these values based on an alpha value equal to V−[V], where [V] is the integer part of V.

15. The system of claim 14, wherein the second unit further includes a fifth set of registers, a fifth multiplexer and a third adder, wherein the fifth set of registers are configured to store vertical step values $Sy_0$, $Sy_1$ and $Sy_2$, wherein the fifth multiplexer is configured to select one of the vertical step values, wherein the third adder is coupled to receive the selected vertical step value from the fifth multiplexer and the address V provided at the output of the fourth multiplexer, wherein the third adder is configured to add the selected vertical step value to the address V to obtain an incremented value of the address V, wherein the current address register is coupled to receive the incremented value from the third adder.

16. The system of claim 1, wherein the first unit and second unit operate in parallel.

17. The system of claim 1, wherein the horizontal weight table and the vertical weight table are programmable.

18. The system of claim of 1, wherein the horizontal weight table and the vertical weight table are loaded with corresponding sets of values to induce edge blending on the image generated by a first projector with respect to the overlapping images generated by one or more other projectors.

19. The system of claim 1, wherein the horizontal weight table and the vertical weight table are loaded with corresponding sets of values to induce hot spot correction on the image generated by a first projector.

20. A system for correcting the intensities of pixels supplied to a projector, wherein an image generated by the projector has a number of regions formed by the overlapping of the image with one or more other images generated by one or more other projectors, the system comprising:
a first unit configured to generate a horizontal scaling value;
a second unit configured to generate a vertical scaling value;
a first multiplier configured to multiply the horizontal scaling value and the vertical scaling value to obtain a scaling coefficient;

a set of one or more additional multipliers configured to multiply components of an input pixel by the scaling coefficient to determine components for an output pixel;

wherein the first unit includes a digital differential analyzer (DDA) to repeatedly increment an address U in the address space of the horizontal weight table, wherein a start value and an increment value used by the DDA changes varies between regions in the horizontal direction, wherein the boundaries between the regions are not vertically aligned;

wherein the second unit includes a second DDA to repeatedly increment an address V in the address space of the vertical weight table, wherein a start value and increment value used by the second DDA changes between regions in the vertical direction.

* * * * *